United States Patent [19]

Devos et al.

[11] Patent Number: 5,381,516
[45] Date of Patent: Jan. 10, 1995

[54] BINARY RESISTOR NETWORK AND ITS USE FOR LABELLING RELATED COMPONENTS OF DIGITISED IMAGES IN ARTIFICIAL VISION

[75] Inventors: Francis Devos, Orsay; Yang Ni, Les Ulis, both of France

[73] Assignees: France Telecom; Centre National de la Recherche Scientifique, Paris, France

[21] Appl. No.: 968,072

[22] Filed: Oct. 30, 1992

[30] Foreign Application Priority Data

Oct. 31, 1991 [FR] France .................. 91 13466

[51] Int. Cl.⁶ .................................. G06F 15/18
[52] U.S. Cl. .................................. 395/27; 395/24
[58] Field of Search .......................... 395/27, 24

[56] References Cited

U.S. PATENT DOCUMENTS

| | | | |
|---|---|---|---|
| 4,809,347 | 2/1989 | Nash et al. | 395/21 |
| 4,962,471 | 10/1990 | Cornelissen | 364/787 |
| 5,038,386 | 8/1991 | Li | 395/800 |

FOREIGN PATENT DOCUMENTS

| | | | |
|---|---|---|---|
| 8806322 | 8/1988 | WIPO | G06F 15/66 |
| 8904017 | 5/1989 | WIPO | G06F 15/66 |

OTHER PUBLICATIONS

Mixed-Mode Simulation Tools for Custom VLSI Design R. Salama et al. 16-19 May 1988.
High-Speed CMOS Adder and Multiplier Modules for Digital Signal Processing in a Semicustom Environment J. Kernhof, Jun. 1989.
VLSI Implementation of Moment Invariants for Automated Inspections G. A. Armstrong et al. 11-13 Mar. 1990.
A Neural Net Based Architecture for the Segmentation of Mixed Gray-Level and Binary Pictures Ali Tabatabai; Terry P. Troudet IEEE 1991, Jan. 1991.

Primary Examiner—Allen R. MacDonald
Assistant Examiner—Richemond Dorvil
Attorney, Agent, or Firm—Larson and Taylor

[57] ABSTRACT

A binary resistor network is provided for the labelling of related components of binary or binary-converted images and for artificial vision comprising a plurality of peaks each joined by arches forming binary resistors. Each peak is provided with an elementary processor which enables, with the assistance of a central controller, the association of at least one associative function with each of the arches and a binary constraint with one or more peaks, thus making possible to provide for selective processing of data stored at the site of each of the elementary processors. Each arch of the network is equipped with an associative OR function and forms an accelerated Manchester chain, the establishment time of the network through application of local binary constraints thus being thus linear with the number of peaks.

8 Claims, 8 Drawing Sheets

BINARY RESISTOR NETWORK AND ITS USE FOR LABELLING RELATED COMPONENTS OF DIGITISED IMAGES IN ARTIFICIAL VISION

Performing artificial vision functions has as its object, on the basis of the processing of two-dimensional image information, the extraction of items of pertinent symbolic information from these images. Extraction of such symbolic information items implies, on the one hand, a function of quantitative measurement of an information item relating to an image data item, such as the luminance for an image point, or pixel, and, on the other hand, a cognitive function by a fusion of the information items stemming from the measurement function.

Figure 1:
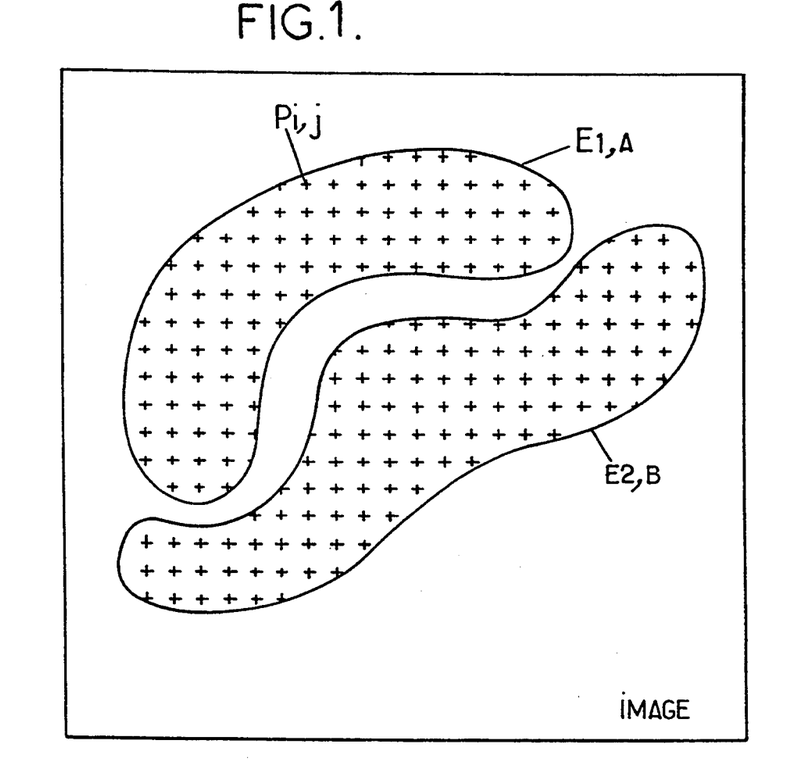

One of the cognitive functions which is of major interest consists, as represented diagrammatically in FIG. 1, for a given image, in distinguishing in this image one or more discrete objects or entities E1, E2, called related components, forming such an image.

One solution, for performing such a function for distinguishing or separating abovementioned discrete objects or entities has, up till now, consisted in producing cellular machines for artificial vision consisting essentially of a two-dimensional table of processors, each processor carrying out local or point operations for a corresponding pixel. Thus, in the more particular case of binary-type digitized images, each pixel having a luminance value 0 or 1, the processors of this type of machine do make it possible to associate the same index with each pixel of the same value of a same discrete entity, each of the abovementioned pixels constituting a constituent element of this discrete entity. The discrete entity E1, E2 is then distinguished, independently of any consideration relating to its shape or its geometrical extent, by the rule of uniqueness of the label A or B for each discrete entity in question.

Currently, many algorithms for label attribution, and hence for distinguishing related components, have been proposed, especially for massively-parallel machine configurations. By way of example, reference could usefully be made to the works published by R. Cypher, J. L. C. Sanz, L. Synder "Algorithms for Image Component Labelling on SIMD Mesh connected computers" Proceedings 1987 Intl. Conference on Parallel Processing.

However, nearly all the algorithms proposed are based on the employment of general-purpose machines which cannot satisfy the requirement to implement a high-performance interconnection network, especially for implementing the algorithm used in artificial vision.

Furthermore, some of the abovementioned algorithms, although they require a symptotically short execution time, can be implemented only at the cost of a very significant complexity in programming, of a prohibitive hardware cost, via non-local interconnection networks such as pyramid, hypercube or other networks.

By way of non-limiting example, it will be recalled that the corresponding algorithms used in massively-parallel processor machines, such as those machines produced by the GOODYEAR AEROSPACE company in the United States of America require, for performing a labelling process for related components of binary images of 128×128 pixels, over and above signal input-output times, from 30 to 900 ms for a peak computational power of 6553 million operations per second, on numbers coded over 8 bits.

The object of the present invention is to propose the implementation of a binary resistor network and its use, especially for labelling related components of digitised images in industrial vision.

Another object of the present invention is the production of such a network for the processing of digitised images of 256×256 pixels in the form of a monolithic integrated circuit.

Another object of the present invention is the implementation of a protocol for use of such a network for labelling related components of digitised images in artificial vision.

The binary resistor network which is the subject of the present invention is noteworthy in that it comprises a plurality of peaks each linked by arches forming a binary resistor. Each peak comprises an elementary processor making it possible, from a central controller, to associate at least one associative function with each of the arches and a binary constraint with one or more peaks, which makes it possible to provide for selective processing of data stored at the site of each of the elementary processors. Each arch of the network is equipped with an associative OR function, by means of each elementary processor.

The binary resistor network which is the subject of the present invention finds an application in labelling related components of digitised images, and, more generally, in image processing and in movement detection.

BRIEF DESCRIPTION OF THE DRAWINGS

A more detailed description of a binary resistor network in accordance with the subject of the present invention and of its use for labelling related components of digitised images will be given below in relation to the drawings in which, except for FIG. 1 which was discussed above and relates to the prior art and is a diagrammatical representation of an exemplary image including two discrete objects or entities.

A more detailed description of the binary resistor network which is the subject of the present invention will be given in relation to FIG. 2.

Figure 2:
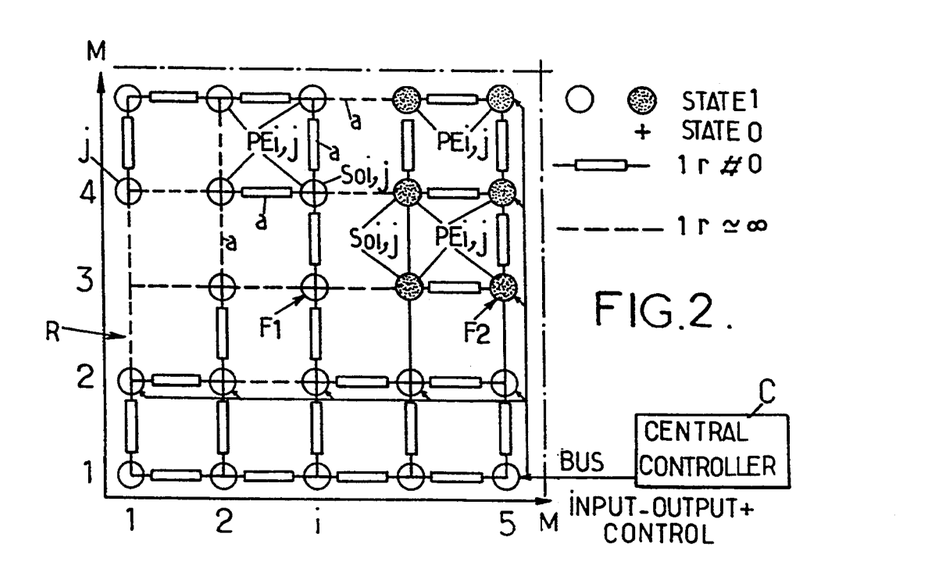
FIG. 2 represents, diagrammatically, the spatial configuration of a binary resistor network which is the subject of the present invention.

As has been represented in the abovementioned FIG. 2, the binary resistor network which is the subject of the present invention comprises a plurality of peaks each joined by arches, these arches forming binary resistors.

In a non-limiting way, the network R which is the subject of the present invention has been represented in the form of a rectangular network exhibiting a rectangular meshing, the peaks being denoted $So_{i,j}$ and indexed with respect to two arbitrary index axes with line order j and column order i, the arches being denoted a.

According to an advantageous characteristic of the binary resistor network which is the subject of the present invention, each peak $So_{i,j}$ comprises an elementary processor, denoted $PE_{i,j}$, making it possible, from a central controller, denoted C, to associate at least one associative function with each of the arches a and a binary constraint, denoted in a general way F, F1 or F2 for example with one or more peaks $So_{i,j}$.

The associative function or functions associated with one or more of the abovementioned arches makes it possible to provide selective processing, of analog type, of data stored at the site of each of the elementary processors $PE_{i,j}$.

According to one particularly advantageous characteristic of the binary resistor network which is the subject of the present invention, each arch a of the network is equipped with an associative OR function, by means of each elementary processor, as will be described below in the description. The logic OR function is defined in positive logic and corresponds to a logic AND function in negative logic.

In FIG. 2 each arch is symbolically represented in a logic state, denoted 1, corresponding to a resistance substantially equal to 0 or of low value, r#0, by a bold line between two consecutive respective peaks, while an arch a in the 0 state, that is to say substantially non-conducting, exhibits a resistance r, little different from the value infinity, the abovementioned arches thus exhibiting, according to their conducting or non-conducting state a conductance ratio equal, for example, to $10^5$, this conducting or non-conducting state corresponding, for the arch in question to a logic state 1 or respectively 0.

It will be noted moreover that the central controller C is linked to the network R by means of a BUS link providing the input-output functions and the control function for each of the elementary processors $PE_{i,j}$ associated with each corresponding peak $So_{i,j}$ of the binary resistor network which is the subject of the present invention.

In a general way, it will be understood that the binary resistor network which is the subject of the present invention allows, following the configuration of this network, that is to say the creation of a previously-quoted arbitrary state for each arch a and the application of constraints, such as F1 and F2 at the site of one or more peaks $So_{i,j}$ of the network as represented in FIG. 2, to provide analog type processing of these constraints, that is to say segmented distribution of the constraint values, which are analysed either in voltage value or in current value, in the areas of the network linked in a related way by the arches whose logic state is in the 1 state, that is to say the conducting state.

This type of network is thus particularly advantageous for the low-level processing of artificial vision, it being then possible to associate with each peak $So_{i,j}$ of the network, in the region of the corresponding elementary processor $PE_{i,j}$, a binary pixel value for example, the analog processing of the applied binary constraints, being analysed by injection, in the region of one or more peaks $So_{i,j}$ of a voltage or of a current, being provided by the conducting meshing produced by the substantially conducting arches in the 1 state which are configured in advance or in the course of processing over corresponding areas of the network.

It will obviously be understood that the processing of the abovementioned binary constraints may be analog in nature, any voltage or any current injected at the site of one of the peaks constituting the abovementioned binary constraint having the effect, at a defined peak $So_{i,j}$ of a single preconfigured area, of generating a corresponding level of currents, respectively of voltages, corresponding to a convolution product of the binary constraints thus injected and of the transfer functions produced by the various arches according to their conducting or non-conducting state.

In the same way, it will be understood that the processing thus performed may also be considered as a logic-type processing insofar as, for each peak $So_{i,j}$ of the network in question, the corresponding current or voltage level may be considered as a logic state variable corresponding to the logic state of the peak in question, this logic state being denoted $Si,j$.

However, and according to one particularly advantageous aspect of the binary resistor network which is the subject of the present invention, the establishment time of a conventional meshed network, on application of a binary constraint for example, at a peak $So_{i,j}$ corresponding physically to an energy transfer between the injection point of the abovementioned constraint and any related point, linked by conducting arches, is normally an exponential function of the number of peaks thus linked.

In accordance with a particularly advantageous aspect of the binary resistor network which is the subject of the present invention, each arch of the network forms an accelerated Manchester chain in such a way that the establishment time of the network, after application of the local binary constraints, is thus linear with the number of peaks Soi,j, as will be described later in the description. It will be noted that the introduction of an accelerated Manchester chain at the site of each arch a of the network in the conducting state makes it possible to substitute, for the abovementioned energy propagation, a pulse-type propagation, which, in accordance with a particularly advantageous aspect of the binary resistor network which is the subject of the present invention, allows the establishment time of the network, after application of the local binary constraints, to be made substantially linear with the number of constituent peaks Soi,j of the abovementioned network. Hence, the processing times as a function of the applications in question and, needles to say, of the number of constituent peaks of the network which is the subject of the present invention, may be rendered up to 10,000 times shorter with respect to the network processing time of the prior art.

A more detailed description of an elementary processor PEi,j will now be given in connection with FIG. 3a.

At point 1 of the abovementioned Figure, is represented an elementary processor which is particularly adapted to the implementation of the binary resistor network which is the subject of the present invention.

In a general way, each elementary processor makes it possible to provide for at least the configuration of the network by choice and the control of the value of the binary resistance of each arch joining two consecutive peaks, the injection of the constraint value F at the site of each peak Soi,j, the absence of injection of a binary constraint corresponding to the injection of a binary constrain value equal to 0, as well as the reading of the resultant local state Si,j for the peak in question or for any peak Soi,j, of a segmented area defined by the set of peaks linked by arches in the conducting state as represented in FIG. 2.

Moreover, and for appropriate processings, each elementary processor PEi,j makes it possible to carry out the memory storage of a conditional state Ai,j as a function of the binary constraint injected and of the local state Si,j of the peak in question.

Finally, and advantageously, each elementary processor PEi,j makes it possible to perform successive iteration of the abovementioned steps of injection and memory storage for a plurality of successive binary constraint values corresponding, for example, to digitised data in the form of bit maps.

A more detailed description of an application of a binary resistor network such as represented in FIG. 2 to the labelling of related components, that is to say of the neighbouring pixels of the same value of a discrete entity of an image, will be given for this purpose later in the description.

Figure 3A:
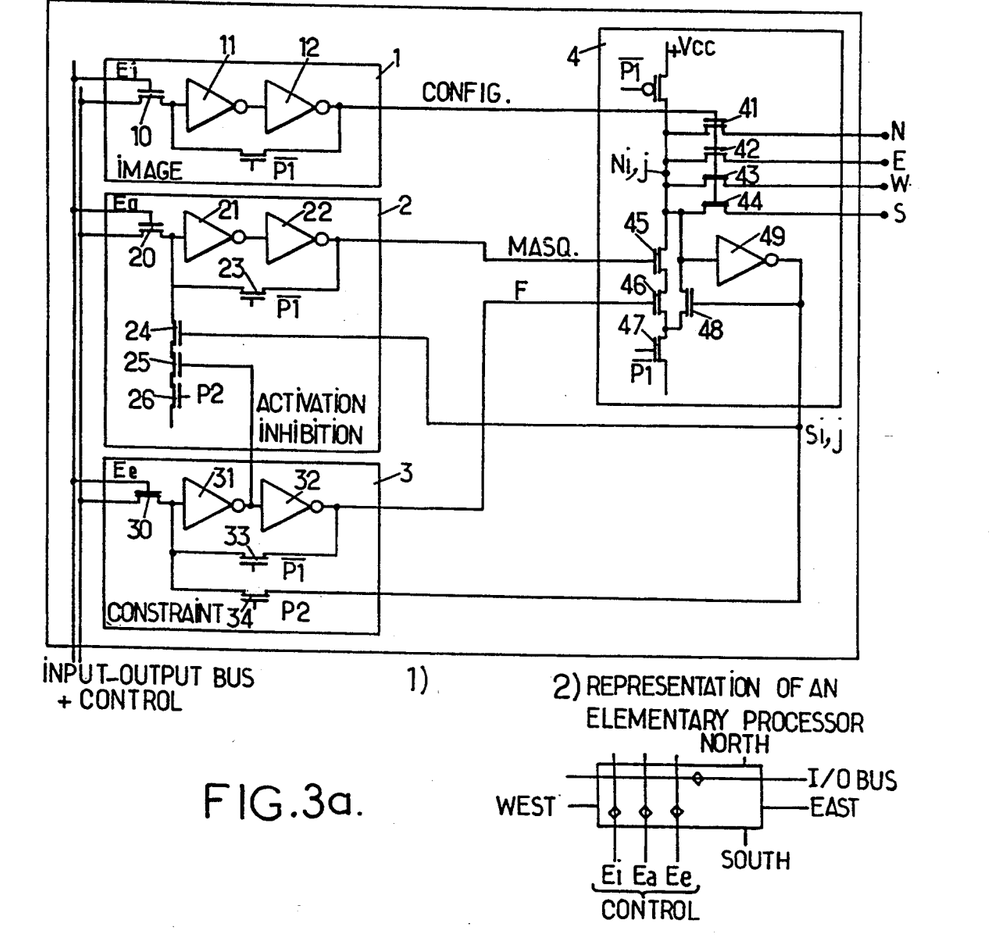
FIG. 3a represents a general, non-limiting diagram of the implantation of an elementary processor, associated with each peak of the binary resistor network which is the subject of the present invention.

As has further been represented in FIG. 3a, each elementary processor PEi,j comprises at least one storage register 1 for the digitised information to be processed, that is to say for the binary converted image, this register being controlled in read-write from an input-output BUS link and, on reading, delivering a signal, denoted config, making it possible to configure the network, that is to say to attribute to each arch a the conducting state, state 1, or the non-conducting state, state 0.

Each elementary processor also comprises an activation-inhibition control register 2 for binary constraint F injection in the region of the corresponding peak Soi,j in question, with which the elementary processor PEi,j is associated. This control register 2 is controlled in read-write from the abovementioned input-output BUS link and, on reading, delivers a signal masq for masking the injection of the abovementioned binary constraint as will be described below in the description.

Each elementary processor PEi,j also comprises a storage register 3 for the binary constraint F to be imposed on the corresponding peak Soi,j in question.

The abovementioned elementary processor PEi,j finally comprises a circuit 4 forming a node Ni,j for the network. It will be noted that the node Ni,j and the corresponding associated elementary processor PEi,j form the peak Soi,j of the binary resistor network.

As will be noted on observing FIG. 3a at point 1 of the latter, the circuit forming a node Ni,j advantageously comprises 4 switching transistors 41, 42, 43, 44 each forming an arch transistor. Each arch transistor is indexed, in an advantageous way, by its relative north-south-east-west orientation, denoted N,S E,W, and is intended to provide for the link of the node in question with a neighbouring node. Each arch transistor receives on its control electrode the configuration signal config delivered by the storage register 1 for the digitised information to be processed.

Moreover, the node-forming circuit Ni,j comprises a pre-charge transistor, denoted 40, connected between the supply voltage of the elementary processor +Vcc, and the node Ni,j, this pre-charge transistor being controlled in switching by a pre-charge signal, denoted P1.

The node-forming circuit Ni,j also comprises an activation-inhibition control circuit 45, 46, 47 for the injection of the binary constraint at the site of the peak Soi,j in question. This activation-inhibition control circuit comprises, on the one hand, in cascade between the node and the reference potential (earth) a first activation-inhibition transistor 45 receiving, on its control electrode, the masking signal masq delivered on reading by the activation-inhibition register 2, a second binary constraint F injection transistor 46 receiving, on its control electrode, the binary constraint F signal delivered by the binary constraint storage register 3 and a third terminating transistor 47, of a conduction type opposite to that of the pre-charge transistor.

The activation-inhibition control circuit comprises, moreover, a feedback circuit formed by a feedback transistor 48, mounted as a switch between the node Ni,j and the common point between the second, 46, and the third, 47, transistors and by a logic inverter 49 whose input is connected to the node Ni,j and whose output, delivering the signal Si,j which represents the local state of the peak Soi,j in question, is connected to the control electrode of the feedback transistor 48 and to a control input of the activation-inhibition storage register 2 and of the binary constraint storage register 3.

At point 2 of FIG. 3a an elementary processor PEi,j has been represented from the input-output point of view. Each elementary processor comprises, as represented, an input-output and control BUS, the control BUS proper permitting transmission of a control signal from the image Ei register 1, from the activation-inhibition Ea register 2, and from the constraint Ee register 3, as well as, needless to say, the arch transistors connected to the north N, east E, west W, and south S outputs.

Figure 3B:
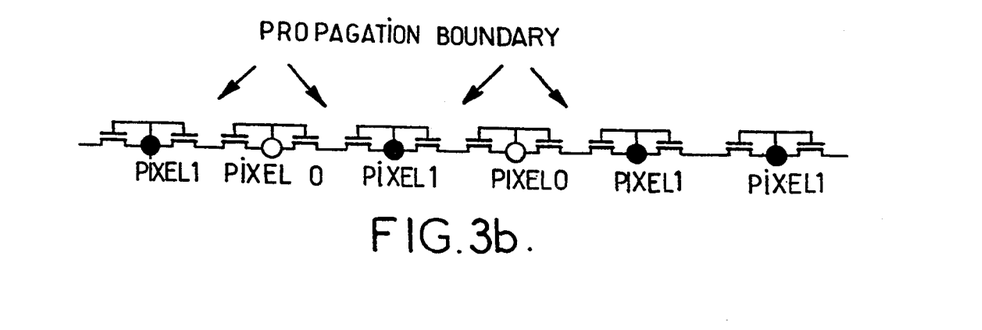
FIG. 3b represents an explanatory diagram for implementation of the constituent elementary processors of the binary resistor network which is the subject of the present invention.

It will be noted that the interconnection of two neighbouring elementary processors, PEi,j and PEi,j+1 by their respective north and south connections, according to the convention adopted for FIG. 2, has the effect in reality of constituting each arch a of the binary resistor network which is the subject of the present invention by two switching transistors connected in series, the transistors 41 of the elementary processor PEi,j and 44 of the neighbouring elementary processor PEi,j+1, due to the connection of the north and south outputs of the two abovementioned elementary processors. Needless to say, it is the same for the connection of every elementary processor PEi,j to every neighbouring processor of the latter. Such an embodiment is represented in FIG. 3b for a line or a column of the network as represented in FIG. 2, a pixel of value 1 or 0 being associated with each peak Ni,j of the network. The information propagation route is interrupted in the region of each arch a if a single one of the transistors in fact constituting each arch of the network receives a zero voltage, for example on its control electrode, as will be described later in the description.

According to a particularly advantageous characteristic of the binary resistor network which is the subject of the present invention, as will be described now in a more detailed way in connection with FIG. 3c, the node-forming circuits Ni,j of the network, which are interconnected by the arch transistors form, in a particularly advantageous way, an accelerated Manchester chain.

Figure 3C:
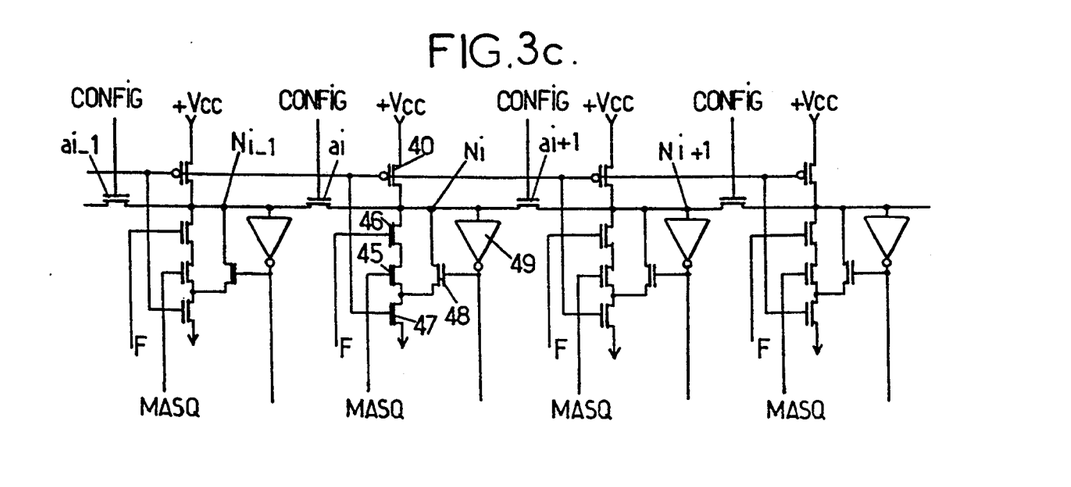
FIG. 3c represents, in a more detailed way, a diagram of a control circuit for application of a binary constraint at the site of the peaks joined together by arches in the network which is the subject of the invention employing an accelerated Manchester chain.

Such a chain is represented in FIG. 3c, this chain corresponding, for example, to that of a line of the network represented in FIG. 2 when, by non-limiting assumption, the arches a–i are all made conducting, such a line possibly corresponding, in the representation of FIG. 2, to the line No.1 for example. In the case of FIG. 3c, j=1 is taken for notation, the index j not therefore being specified for the description of the abovementioned Figure.

The operation of the Manchester chain thus implemented is as follows: each control circuit implemented by the transistors 40, 45, 46, 47 and interconnected by the arch transistors which are made conducting, makes it possible, following a step of pre-charging under the control of a phase signal P1 allowing the potential of each node Ni,j to be brought to the value of the supply voltage, to carry out an end-of-pre-charge step and a step of connection of the third terminating transistor 47 to the reference potential, the earth, due to the nature of the opposite conductivity type of the transistors 40 and 47. As a function of the masking signal, masq, and of the binary constraint signal F, applied to the transistors 45 and 46, a step of discharge of the parasitic capacitances of the node Ni and thus of the node Ni,j in question, is carried out by means of the feedback circuit 48, 49. In a general way, it will be understood that the abovementioned feedback circuit, by means of the logic invertor 49, makes it possible to render the phenomenon of discharge of the abovementioned parasitic capacitances cumulative, and to carry out the latter in a very short time, in such a way as to give it the character of a pulse discharge. The discharge of the abovementioned parasitic capacitances at the node Ni, and hence Ni,j, makes it possible thus to lower the potential of the node in question, which, due to the conduction of the arch transistors and of the corresponding arch a–i, brings about, in turn, the discharge of the node Ni+1 or Ni−1 which is immediately adjacent, and so on.

Such an operating mode makes it possible to provide for the discharge of the parasitic capacitances from all the nodes interconnected to the corresponding peak Soi,j forming the related peaks of the latter, site of the initial discharge. The segmented diffusion of the local binary constraint applied at the site of the peak Soi,j in question towards the related peaks is thus performed. Moreover, via the abovementioned operating mode, the processing and establishment time of the binary resistor network which is the subject of the present invention is made linear as a function of the number of peaks, which makes it possible to reduce the processing time by a factor of 1/10,000 with respect to the devices of the prior art.

Figure 3D:
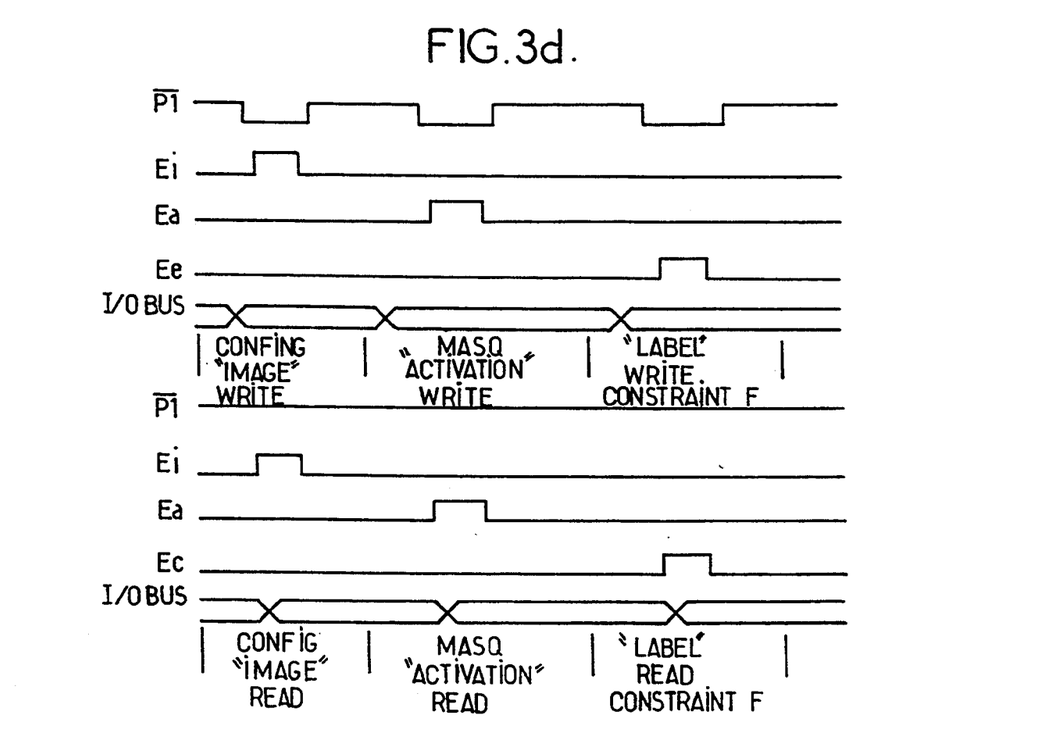
FIG. 3d represents a timing diagram of the control signals for each constituent elementary processor of the network which is the subject of the present invention.

The operation of each elementary processor PEi,j and of the Manchester chain, as represented in FIG. 3b, will be described in a general way in connection with FIG. 3d.

The image 1, activation-inhibition 2 and constraint 3 registers are respectively constituted by latches formed by two logic inverters in cascade, 11–12, 21–22 and 31–32, and by a loop transistor 13, 23, respectively 33, these transistors being controlled by a control signal P1, that is to say the precharge control signal of the precharge transistor 40 mentioned above. Needless to say, the precharge signal P1 is delivered by the control BUS from the central controller C. The input on writing, respectively on reading, of the latches thus constituted is controlled for each register by means of a transistor denoted 10, 20, respectively 30, each of these transistors being controlled by a control signal delivered by the control BUS, each signal being denoted respectively Ei, Ea, Ee. Writing, respectively reading, in the image 1, activation-inhibition 2 and constraint 3 registers is carried out from the single inputs-outputs BUS on the basis of abovementioned precharge signals P1 and control signals Ei, Ea and Ee, as represented in FIG. 3d. It will be noted that the write phase corresponds to the storage, in each of the abovementioned registers, of the configuration, config, respectively masking, masq signals, of the constraint F.

Similarly, the step of reading the abovementioned registers makes it possible to generate the configuration, config signal applied to the arch 41, 42, 43, 44, respectively masking masq, constraint F transistors. Updating of the activation-inhibition 2 register is carried out by means of transistors 24 and 25 and of a terminating transistor 26 allowing synchronisation of this update by means of a phase signal P2 delivered by the control BUS. The two transistors 24 and 25 are controlled, on the one hand by the value of the local state Si,j, of the corresponding node Ni,j, that is to say by the signal delivered by the logic inverter 49 of the feedback circuit, respectively by the signal delivered by the logic inverter 31, these two transistors 24 and 25 thus performing an AND function between the local state of the corresponding node Ni,j and the constraint F to be effectively applied to the latter node. Hence, when the value 0 is written into the activation-inhibition storage register 2, that is to say when in read phase, the masking signal masq, has this value 0, the value of the local state of the node Ni,j, that is to say the signal Si,j after the establishment time of the network is equal to 1, which permits updating of the activation-inhibition register.

The constraint or label register 3 records one bit of the current constraint associated with the peak Soi,j in question, the current constraint being able to be replaced conditionally by the value of the local state of the node Ni,j, that is to say by the value of the signal Si,j, of the peak Soi,j in question by means of the transistor 34 also controlled by the phase signal P2.

By virtue of the operation of the elementary processor PEi,j as represented in FIG. 3a, and, finally 3c, the constraint stored at the site of the control register 3 may or may not be applied to the corresponding node Ni,j, that is to say to the associated peak Soi,j, by means of the AND function performed by the transistors 45 and 46 of the activation-inhibition control circuit for the injection of the binary constraint at the site of the peak in question.

Needless to say, each elementary processor may be produced in C-MOS technology, in the form of an integrated circuit, the whole of the binary resistor network which is the subject of the present invention also being produced by means of this technology.

Figure 4:
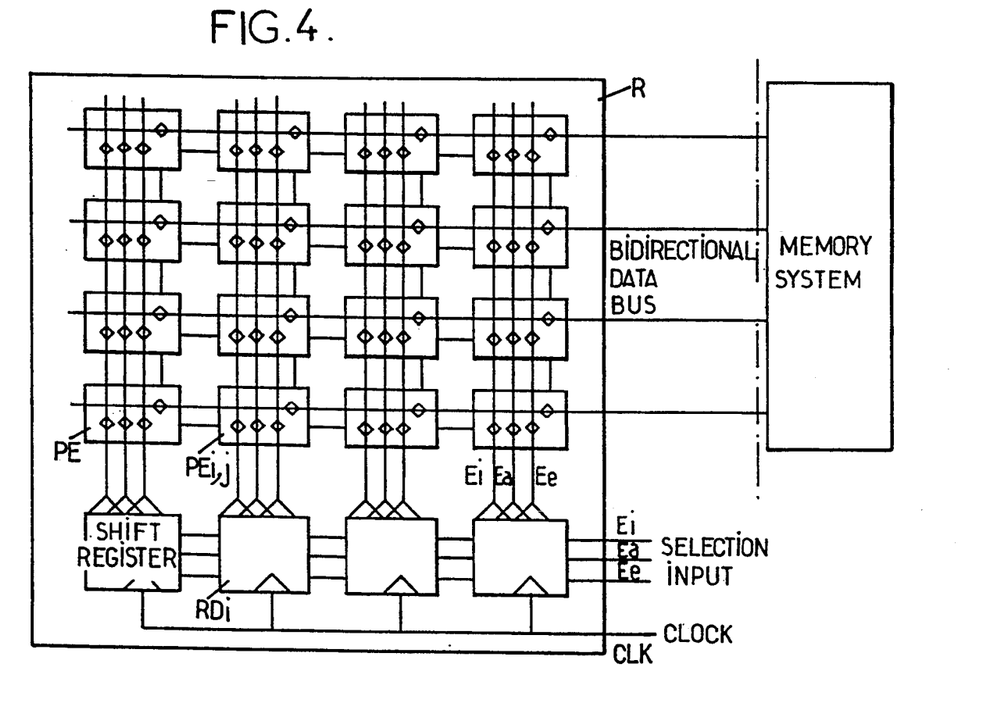
FIG. 4 represents a general configuration of the implantation of the elementary processors for forming the binary resistor network which is the subject of the present invention.

A description of such a network is represented in FIG. 4 by means of the representation of each elementary processor given at point 2 of FIG. 3a. Preferably, the network is produced in the form of a matrix of elementary processors PEi,j, each processor being connected to its north, south, east and west neighbours. The matrix of elementary processors as represented in FIG. 4 may be produced simply by duplication of the elementary processors as represented in FIG. 3a. Preferably, the inputs-outputs BUS of the elementary processors belonging to the same line are connected together, by bidirectional data BUS, and thus share the same imput-output lead. Such a configuration implies that the elementary processors of a single line must be charged or discharged sequentially. Such an operation can be carried out by means of a shift register line, a shift register RDi being associated with a column of corresponding elementary processors. The shift register line shifts, for example, the previously-described control signals Ei, Ea, Ee from right to left by selecting the corresponding column of elementary processors, these signals being then transmitted simultaneously in parallel to all the elementary processors of a single column. Hence, a network constituted by a matrix of 256×256 elementary processors requires 256 inputs-outputs leads for the inputs-outputs data BUS.

In FIG. 4 is also represented a clock signal denoted CLK at the site of each shift register, which makes it possible to generate precharge P1 and phase P2 signals.

Moreover, on this same FIG. 4 is represented a memory system, this memory system being a fast external memory. This memory system may advantageously be embodied by part of a host machine in a defined application. This memory system makes it possible to store the input data and all the processing results obtained by implementing the binary resistor network which is the subject of the present invention, the binary or binary-converted images to be processed as well as the content of the activation-inhibition registers of each elementary processor. This memory system may be produced by two-port memories, which are parts of the memory space of the host machine. In this respect, the memory system does not, strictly speaking, form part of the binary resistor network which is the subject of the present invention.

A more detailed description of a use of the binary resistor network which is the subject of the present invention for labelling related components of a binary image or of a bit map forming an elementary binary image of a binary-converted image will now be described in connection with FIGS. 5a and 5b.

Figure 5A:
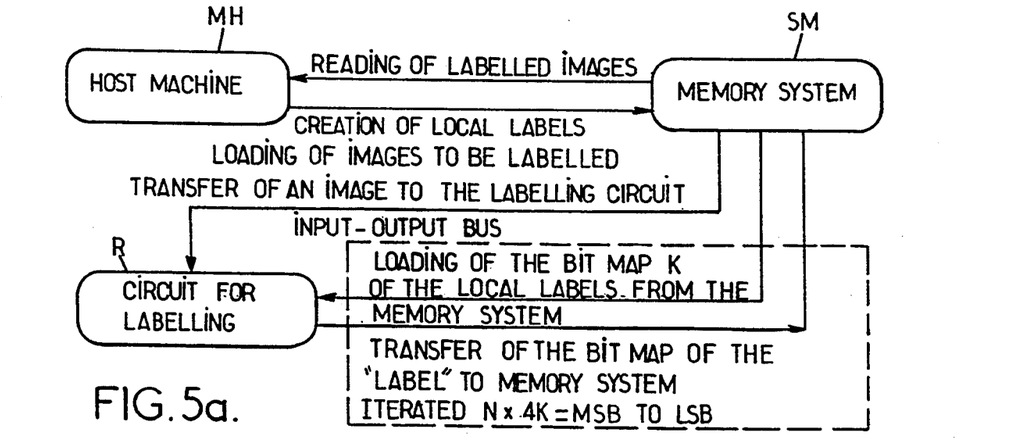
FIG. 5a represents a block diagram of an operator system for labelling related components of digitised images, incorporating a network in accordance with the subject of the present invention.
Figure 5B:
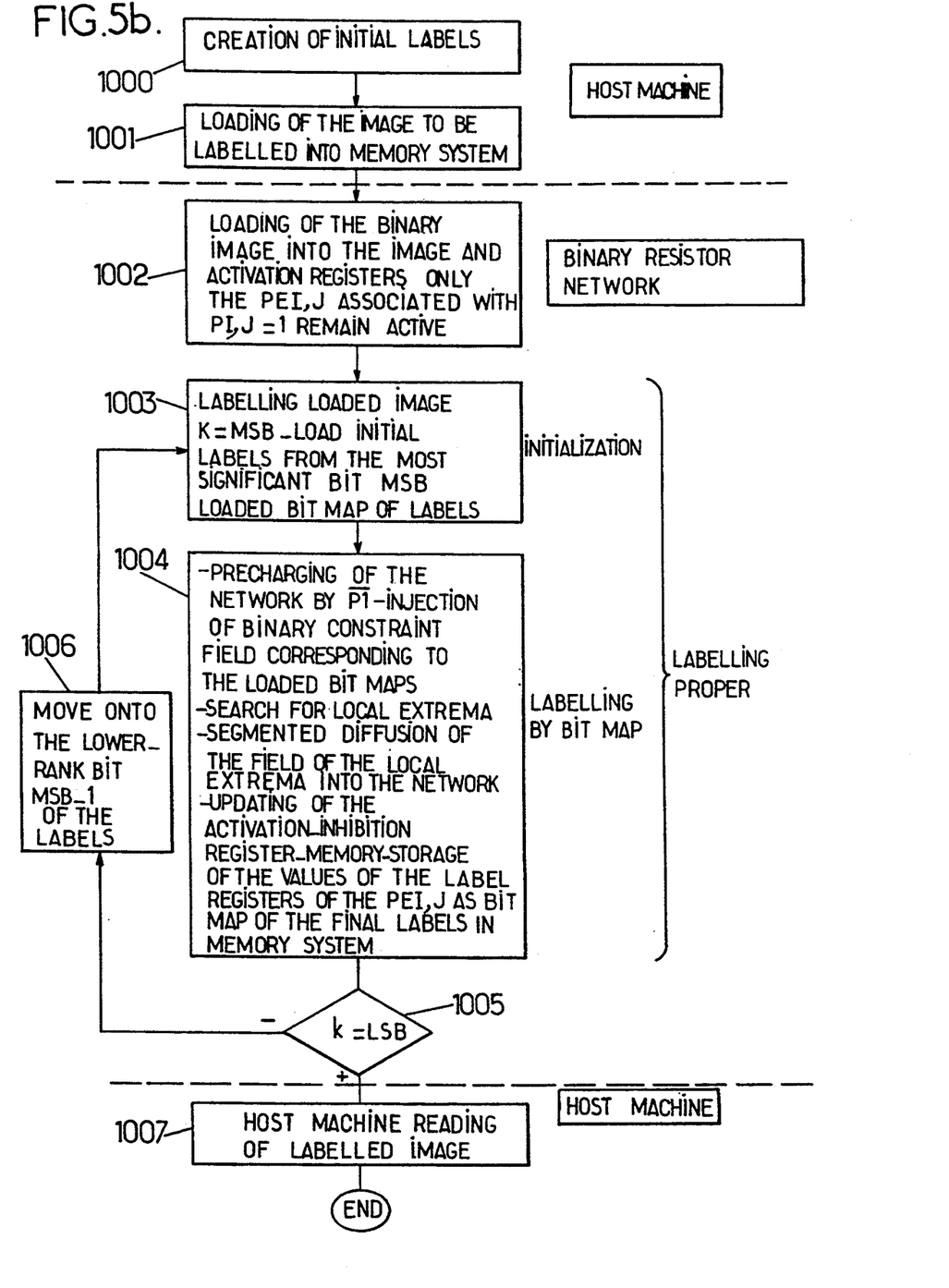
FIG. 5b represents a general organisation diagram of the operating mode of the binary resistor network which is the subject of the present invention during its use for labelling related components of digitised images.

In FIG. 5a is represented the arrangement by functional elements of an operator making it possible to provide labelling of the related components of an image, the term image corresponding to the previously-mentioned definition.

In the application or use of the binary resistor network for labelling related components of a binary image, it will be noted that the constraint applied to a peak Soi,j of the binary resistor network according to the invention corresponds, for this application, to the attribution of a label value or, at least, of a bit of the bit map of the label corresponding to the peak Soi,j in question. Consequently, the word constraint previously used in the description, in particular binary constraint, may be replaced in this application by the word label or by the value of the bit of the corresponding label bit map, which plays the part of binary constraint.

As is represented in FIG. 5a, an operator making it possible to provide for the labelling of the related components of an image in accordance with the subject of the present invention comprises a host machine MH equipped with its memory system SM, the operations between the host machine and the abovementioned memory system consisting in the creation of local labels and in the loading of the images to be labelled into the memory system SM, from the host machine, and reciprocally in reading images labelled by the host machine into the memory system SM. Moreover, the abovementioned operator comprises, needless to say, interconnected with the memory system SM, the network R forming the labelling circuit, this network corresponding to the embodiment of FIGS. 2 and 4 for example. The exchanges between the memory system SM and the network R, as represented in FIG. 5a, consist, on the one hand, in the transfer of an image to the labelling circuit or network R, the loading of the bit map k of the local labels from the memory system, k designating the significance of the bits of the set of labels normally attributed to each pixel, and the transfer, from the labelling circuit, of the label bit map after processing to the memory system SM, these two latter operations being subjected to iteration from the most-significant bit MSB to the least-significant bit LSB.

In the abovementioned application, the labelling of the related components of a binary image consists at a step 1000, in attributing, to the set of bits of given value of the image, a common local initial label, of arbitrary value, then, at a step 1001, in loading the image to be labelled into the working memory system SM, these abovementioned operations being carried out within the host machine.

The application for labelling the related components of the image next consists, at a step 1002, in loading the image from the working memory system into the image register and activation-inhibition register of each elementary processor PEi,j. Thus, a pixel Pi,j of the image is associated with an abovementioned elementary processor. Furthermore, only the elementary processors Pi,j associated with a corresponding pixel Pi,j of given value, the value 1, for example, of the image in question remain active. Such an operation makes it possible to determine the search boundaries in the image for the labelling function proper.

Following the abovementioned step 1002, the application then consists in performing a labelling process proper in an operation 1003 and 1004. Operation 1003 consists in an initialisation process comprising a step of loading of the most significant bit MSB of the local labels at the site of the label storage register 3 of each active processor PEi,j, in such a way as to perform, on the network, loading of a bit map of labels. The abovementioned process 1003 is followed by a process 1004 of labelling by bit map for the bit map in question. The process 1004 consists in successively carrying out precharging of the network by application of the precharge signal P1 to the precharge transistor 40, injection at the site of the corresponding peaks Soi,j of the network, of the binary constraints F or label bit value corresponding to the loaded bit map, search for the extrema, local minima or maxima at the peaks Soi,j of the network, segmented diffusion of the field of the local extrema in the network, updating of the activation-inhibition register 2, then storage of the values of the registers of the labels from the elementary processors PEi,j as bit maps of the final labels in the memory system.

Needless to say, the labelling process proper is reiterated for each lower-rank bit map, MSB-1 of the labels down to the least significant bit LSB by means of a comparison test 1005 of the rank k of the bit map with the LSB value followed, in the negative case, by a step of decrementing of the rank k in question 1006 and by a return to the previously-described initialisation step 1003. The test 1005, in the affirmative case, is then followed by a step 1007 of reading the labelled image by the host machine, then by an end step, for example. Needless to say, the steps 1002, 1003, 1004, 1005, 1006 are carried out by the operator at the site of the binary resistor network R, the step 1007 being carried out again by the host machine. A more detailed description of the search process for the extrema, local minima or maxima at the peak Soi,j of the network will now be given in connection with FIG. 6a in the non-limiting context of a search for maxima.

Figure 6A:
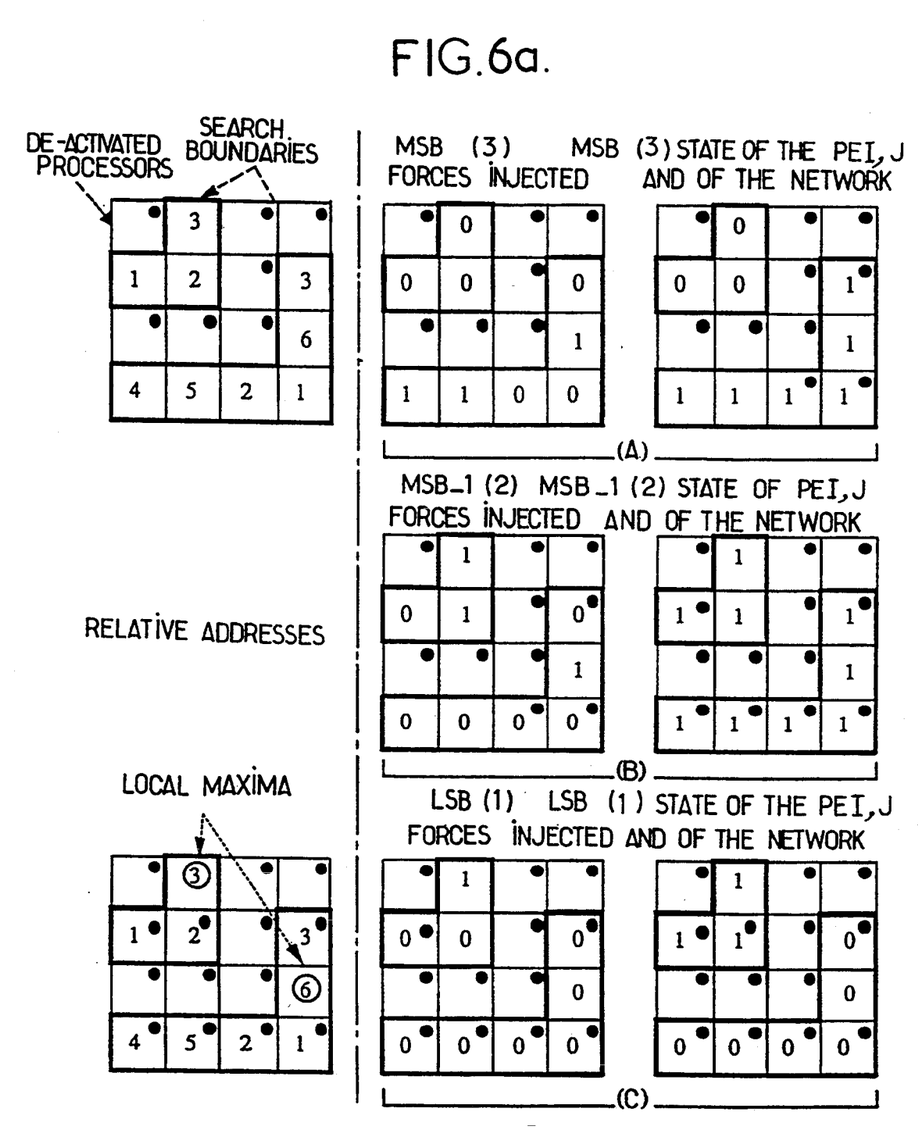
FIG. 6a represents an explanatory diagram of a procedure for seeking a local maximum, of the applied binary constraint, the associated elementary processor containing this maximum remaining the only one active for the corresponding discrete entity of the image in question.

In FIG. 6a is represented the matrix of the elementary processors PEi,j by a square grid, each elementary square representing an elementary processor. The deactivated elementary processors, that is to say those inhibited, for example by the control of the masking transistor 45 of the activation-inhibition control circuit, are represented by a point in the corresponding square. The search boundaries are determined following step 1002 of loading of the image, the search boundaries being, for this reason, delimited by pixels of value 0, that is to say on the matrix of constituent elementary processors of the network by deactivated elementary processors. Furthermore, in FIG. 6a, the FIGS. 1 to 3 represent, by way of non-limiting example, the relative addresses of the elementary processors which are kept active, these addresses being, for example, coded over 3 bits in the context only of FIG. 6a and following figures. Hence, it appears that, in the search boundaries defined on this Figure, the local maxima of the addresses are the Figs. 3, respectively 6.

The search process for the local maxima next consists, at step A represented in FIG. 6a, in injecting the most significant bit MSB, in the form of a binary constraint, of the current label at the sites of the peaks Soi,j of the network, then in masking all the elementary processors PEi,j for which the most-significant bit MSB is different from the current value of the state Si,j of the corresponding peak Soi,j. In the example of FIG. 6a, at point A on the latter, the binary constraints, that is to say the values of the most significant bit of the label of the corresponding addresses for the corresponding elementary processor PEi,j are shown on the left and, on the right, the state of the elementary processors PEi,j of the network, the elementary processors whose current value Si,j of the node Ni,j of the peak Soi,j is different from the value of the corresponding most significant bit MSB being masked, that is to say inhibited, and thus given a dot on the right part of point A in FIG. 6a.

An iteration of the previously described steps of injection and of masking with the point A of FIG. 6a is then carried out, on the one hand, at point B of this same Figure for the lower-rank bit MSB-1 down to the rank of the least significant bit LSB, the bit of rank 1 in the example in question, since the labels are coded over 3 bits, as represented at point C of FIG. 6a. It will be noted that, on the abovementioned point C of this Figure, only the elementary processors PEi,j containing the local maxima of the relative addresses 3 and 6 are, after the abovementioned iteration, kept active, the corresponding address of these processors then being able to be chosen and adopted as label for the set of constituent peaks Soi,j of the corresponding discrete entities defined by previously mentioned search boundaries.

The choice and the holding of the label values in question, at the level of the abovementioned discrete entities, may be performed in accordance with a segmented diffusion process of the field of the local maxima in the network at the site of the peaks Soi,j of the latter, which will be described in connection with FIG. 6b.

Figure 6B:
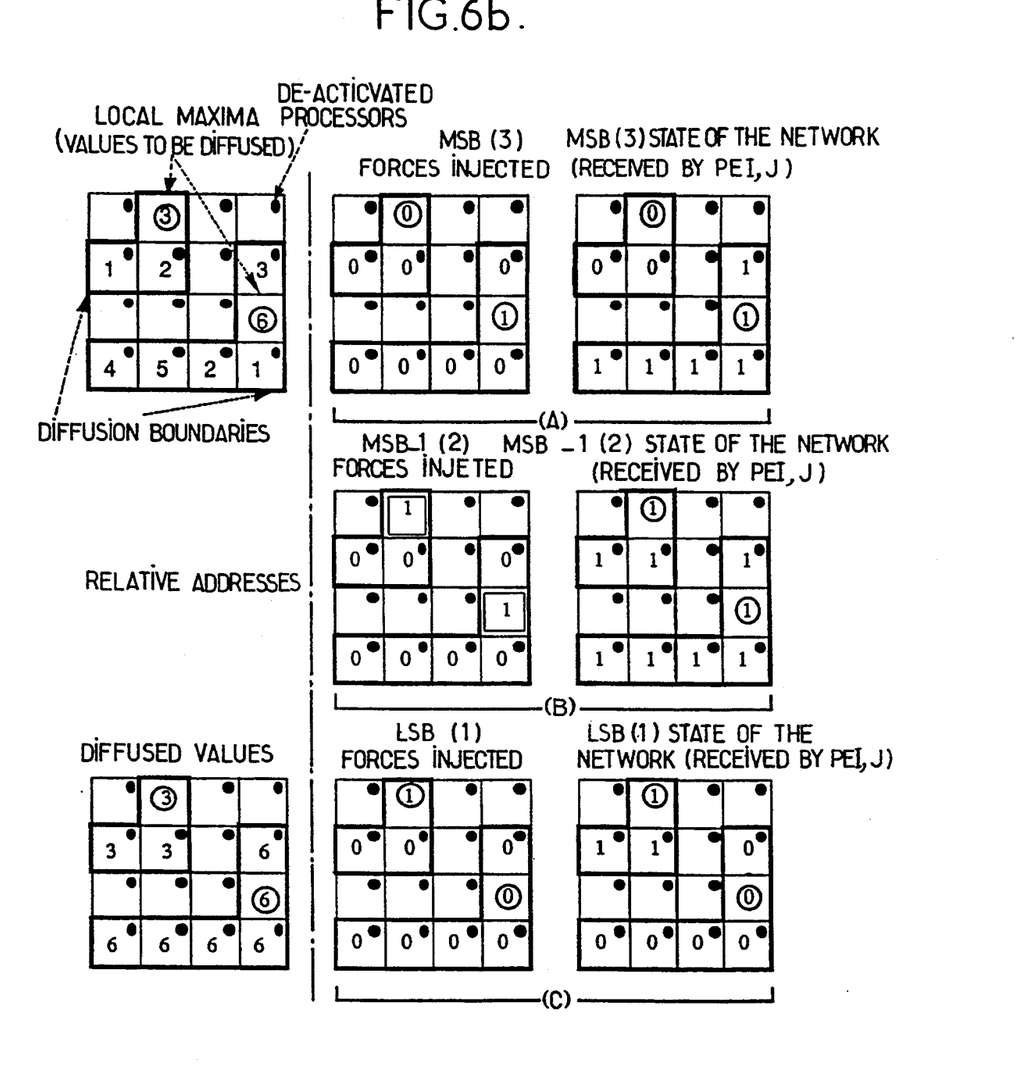
FIG. 6b represents an explanatory diagram for segmented diffusion of a binary information item denoted D in the related components or corresponding discrete entities of the image in question.

In FIG. 6b, on the left, is represented, in a manner similar to FIG. 6a, the relative addressing, coded over 3 bits, of the local maxima of the defined addresses.

As represented in the abovementioned FIG. 6b, the segmented diffusion process then consists in carrying out, as represented at point A of the abovementioned FIG. 6b, the local maxima having been determined in advance as described above, an injection of a binary constraint F=D.AND.Ai,j at the site of each peak Soi,j, where D represents the value of the local maximum in question, and Ai,j represents the stored activation-inhibition value of the elementary processor PEi,j in question.

Reading of the current logic value Si,j of the peak Soi,j is then carried out, and this state is imposed by the elementary processor which is kept active for the discrete entity in question, the label value Si,j corresponding, needless to say, to the local maximum of the bit of the bit map in question. Hence, at point A of FIG. 6b, the injected constraints are represented on the left, the value 0 corresponding to the value of the most significant bit MSB of the relative address 3 coded over 3 bits, this value being thus diffused in the corresponding discrete entity, the value 1 of the second corresponding discrete entity being, in contrast, diffused into the latter, as represented in the right hand part of point A of FIG. 6b.

In the same way, iteration is carried out over the bits of the bit maps of abovementioned local maxima of lower rank, that is to say, as represented at point B of FIG. 6b, on the MSB-1 bit, numbered 2, the constraint injected being equal to 1 for the two discrete entities in the left hand part of point B of this FIG. 6b, this value being then diffused into the right hand part of the abovementioned Figure. The abovementioned operation is then repeated for the least significant bit LSB of rank 1, which has the value 1 in one of the discrete entities and 0 in the other discrete entity in the left hand part of point C of FIG. 6b, these values being diffused into the right hand part of this same Figure on the corresponding discrete entities, that is to say at the level of the elementary processors contained in the corresponding diffusion boundaries.

It will be noted, needless to say, that the superimposition of the right hand parts of points A, B, C of the abovementioned shape, makes it possible to recover the common label value attributed to all the elementary processors of a same discrete entity, this value being, needless to say, that of the local maximum previously determined as represented at the lower left hand part of FIG. 6b.

It will be noted that the labelling process proper, constituted by the search for local maxima and segmented diffusion as previously described, is therefore constituted by a combination of the two previously mentioned processors, as described above.

Figure 6C:
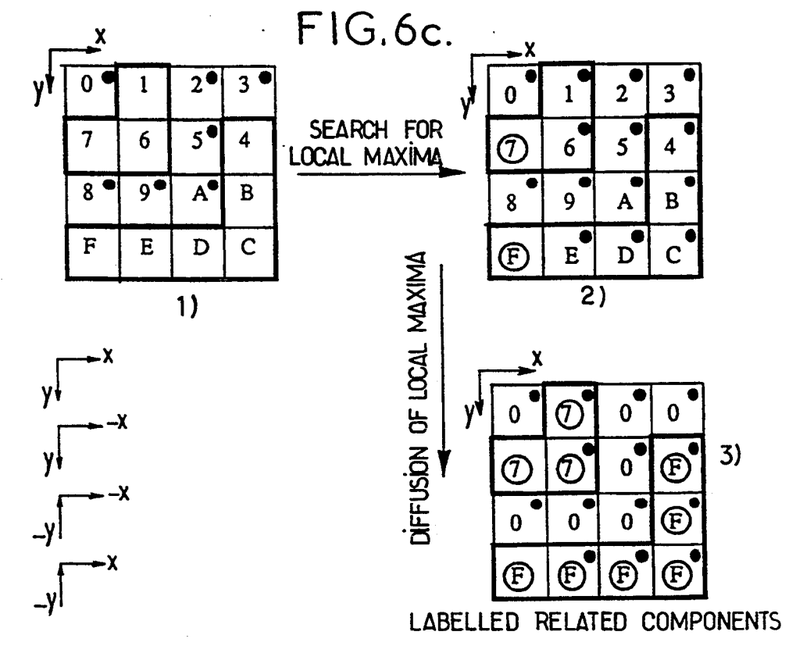
FIG. 6c represents a process for labelling related components or discrete entities of an image by means of a binary resistor network which is the subject of the present invention employing a combination of the local maximum search and segmented diffusion processes described above in connection with FIGS. 6a and 6b.

The implementation of the labelling process proper is represented at the level of a binary resistor network which is the subject of the present invention in FIG. 6c, which, at point 1, represents, needless to say, the attribution of labels constituted, for example, by relative addresses in hexadecimal code, a relative address being associated with an elementary processor, then, at point 2 of FIG. 6c, a search for the local maxima in the previously-described conditions, then, as represented at point 3 of this same FIG. 6c, the diffusion of these local maxima as previously described for obtaining related components thus labelled.

Figure 6D:
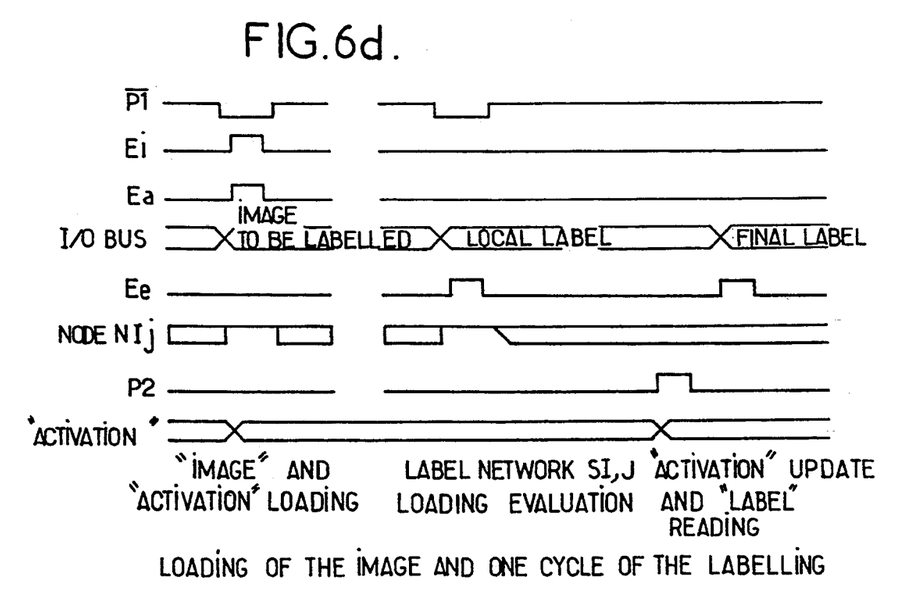
FIG. 6d represents a timing diagram of the control signals for each constituent elementary processor of the network in the case where the operator of FIG. 5a is employed (or implemented) and of the corresponding process illustrated in FIG. 5b.

A timing diagram of the various signals employed to ensure a labelling application for the related components of an image is given at FIG. 6d. This timing diagram gives, on the one hand, the sequencing of the precharge signals P1, input control signals Ei, Ea, Ee for each elementary processor PEi,j in question, state of the node Ni,j of the corresponding peak Soi,j and phase signal P2 for loading of the image and the activation process proper, then these same signals in the case of loading of the label, initial or local label, reading of the actual value of the signal Si,j at the corresponding node Ni,j, then updating of the activation and reading of the label thus obtained.

It will be noted, needless to say, that the binary resistor network which is the subject of the present invention as previously described is not limited solely to the application for labelling the related components of images, but it may also be used for other applications, especially applications such as pattern recognition or geometric measurement of the above-mentioned related components.

With this aim, the attribution of the relative address to each of the elementary processors in question, as previously described in connection with FIG. 6c, may then be replaced by a plurality of attributions of relative addresses such as X,Y; Y,−X; −X,−Y; −Y,X as represented in FIG. 6c. It will be noted then that the iteration of the process of determining local maxima and of diffusion for the various previously mentioned relative addresses by a combination of these relative addresses makes it possible to determine, either the extent or the eccentricity, or the rectangle enclosing every discrete element of a corresponding image.

It will be noted that the implementation of a labelling process by means of a binary resistor network which is the subject of the present invention such as described above for a binary image of 256×256 pixels on the basis of an VLSI-type integrated circuit, this circuit being produced according to the specifications previously indicated in C-MOS 1.5 μm technology requires a maximum of 0.5 milliseconds.

It will be noted, however, that the loading and unloading time of the registers, image register, activation-inhibition register and label register is determined by the configuration of the inputs-outputs. A 100% parallel configuration is not necessary, since the use of a wide BUS, for example of 128 or 256 bits for an image of 256×256 pixels will be a good compromise. In fact, for a 256-bit bus, and a BUS cycle of 100 nanoseconds, the total calculation time for the labelling algorithm described above requires at most 0.85 ms, that is to say that the previously-described operator and the binary resistor network which is the subject of the present invention allow processing of more than 1000 image frames per second.

Finally, it will be noted that the binary resistor network which is the subject of the present invention may also operate as co-processor dedicated to centralisation and to diffusion of information items in operations such as the detection of movement of objects.

We claim:

1. A binary resistor network comprising a plurality of peaks linked together by arches, each of said arches forming a binary resistor and each of said peaks comprising an elementary processor for processing stored local data, said binary resistor network further comprising a central controller for associating at least one associative function with each of said arches and a binary constraint with at least one of said peaks so as to perform selective processing of said stored local data whereby said binary resistor network is thus subjected to an establishment time after application of a said binary constraint, the elementary processor of each arch of said network providing an associative OR function and each arch of said network forming an accelerated Manchester chain, so that the establishment time of said binary resistor network is linear with the number of peaks, wherein each peak has a local site and each elementary processor comprises means for configuring said binary resistor network by choosing and controlling a value for the binary resistor of each arch joining two consecutive peaks, injecting said binary constraint at the site of each peak and reading of a resultant local state for a peak then being processed by the processor, storing a conditional state as a function of the binary constraint injected and of the local state of said peak being processed, and producing successive iterations of the injecting of the binary constraint and the storing of the conditional state for a plurality of values of successive binary constraints corresponding to digitized data comprising bit maps.

2. The binary resistor network of claim 1, wherein each elementary processor comprises:

a local data storage register for storing the local data to be processed, said register being read/write controlled from an inputs-outputs BUS link and delivering, on reading, a configuration signal of said binary resistor network;

a control register for activation-inhibition control of the injecting of a binary constraint at the site of a peak being processed, said control register being read/write controlled from said inputs-outputs BUS link and delivering, on reading, a masking signal for masking the injecting of binary constraint;

a binary constraint storage register for storing said binary constraint to be imposed on said peak being processed;

a node-forming circuit for said binary resistor network, said node-forming circuit and a corresponding elementary processor forming said peak of said binary resistor network being processed, said node-forming circuit comprising:

four switching transistors each forming an arch transistor which has an index and provides a link, through the same index of the node being processed, with a neighboring node, each arch transistor including a control electrode for receiving said configuration signal delivered by said local data storage register;

a precharge transistor of a first conduction type connected between a supply voltage and said node-forming circuit, said precharge transistor being switch controlled by a precharge signal;

a control circuit for activation-inhibition control of the injecting of the binary constraint into the site of the peak being processed, said control circuit comprising, connected in cascade between said node-forming circuit and a reference potential, a first activation-inhibition transistor including a control electrode for receiving said masking signal which is delivered on reading by said control circuit, a second binary constraint injection transistor including a control electrode for receiving said binary constraint signal delivered by said binary constraint storage register, a third terminating transistor of a conduction type opposite to the conduction type of said precharge transistor, said control circuit further comprising a feed-back circuit comprising a feed-back transistor operating as a switch between said node-forming circuit and a common point between said second and third transistors and by a logic inverter having an input connected to said node-forming circuit and an output connected to a control electrode of said feed-back transistor and to a control input of said control register, and said binary constraint storage register, so as to deliver a signal representative of the state of said peak being processed.

3. A method for labelling of related components of a binary image or of a bit map forming an elementary binary image of a binary-converted image using a binary resistor network, said binary resistor network comprising a plurality of peaks linked together by arches, each of said arches forming a binary resistor and each of said peaks having a site and comprising an elementary processor for processing stored local image data in corresponding image registers, said binary resistor network further comprising a central controller for associating at least one associative function with each of said arches and a binary constraint under control of a control register for selectively activating and inhibiting injection of said binary constraint at the sites of at least one peak, so as to perform selective processing of said stored local image data, said method comprising:

attributing a common local initial label to a set of bits of given value of said binary image, loading the image to be labelled into a working memory system, loading said binary image from said working memory system into said image registers and said control register of each elementary processor, an elementary processor being associated with a pixel of the binary image, and only elementary processors associated with a pixel of said given value of said binary image being maintained in an active mode of operation, carrying out a process of labelling comprising:

initialization processing comprising a step loading of the most significant bit of the local labels into a label storage register of each active elementary processor so as to perform on said binary resistor network a loading of a bit map of labels, labelling bit map processing comprising successively carrying out a precharging of said binary resistor network, injecting, at the site of corresponding peaks of said binary resistor network, binary constraints corresponding to said loaded bit map, searching for local extremes at the peaks of said binary resistor network, providing a segmented diffusion of a field of said local extremes in the binary resistor network including injecting a binary constraint which is the AND logical product of the corresponding local extremes and a corresponding value of said control register of the corresponding elementary processor, and reading the current logic value of the peak corresponding to said corresponding elementary processor, updating of said control register, storing in memory in label storage registers of said elementary processors of the values of said labels, said stored values being thus stored as a bit map of final labels in the memory system, reiterating said process of labelling for each successive lower-rank bit map of the labels down to the least significant bit, and storing and reading in said memory system a resultant set of bit maps of said final labels so as to read a labelled image.

4. The method of claim 3, wherein the searching for the local extremes at the peaks of said binary resistor network comprises:

configuring said binary resistor network by defining search boundaries in said binary image, an instant value of the binary image pixel 0 or 1 being associated with each peak of said binary resistor network, injecting the most significant bit in the form of a binary constraint at the sites of the peaks of said binary resistor network, masking the elementary processors for which the most significant bit is different from the instant value of the peak, and carrying out an iteration of the injecting of the most significant bit and the masking of the elementary processors for each lower-rank bit, down to least significant bit rank, with only the elementary processors containing said local extremes being maintained in said active mode of operation.

5. The method of claim 3, wherein said initial label is obtained by attributing the relative address of each peak or pixel to each elementary processor.

6. The method of claim 5, wherein attributing the relative address comprises a plurality of attributions of relative addresses X,Y; Y,−X; −X,−Y; −Y,X; thereby enabling adopting of local maxima, wherein X, Y is the lowest left-hand address, Y,−X is the highest, left-hand address, −X,−Y is the highest, right-hand address, −Y, X is the lowest, right-hand address, a combination of these relative addressings enabling a determination of image extent, image eccentricity, and a rectangle enclosing any discrete element of an image.

7. A binary resistor network comprising a plurality of peaks linked together by arches, each of said arches forming a binary resistor and each of said peaks comprising an elementary processor for processing stored local data, said binary resistor network further comprising a central controller for associating at least one associative function with each of said arches and a binary constraint with at least one of said peaks so as to perform selective processing of said stored local data whereby said binary resistor network is thus subjected to an establishment time after application of a said binary constraint, the elementary processor of each arch of said network providing an associative OR function and each arch of said network forming an accelerated Manchester chain, so that the establishment time of said binary resistor network is linear with the number of peaks, wherein each peak has a local site and each elementary processor comprises:

means for configuring said binary resistor network by choosing and controlling a value for the binary resistor of each arch joining two consecutive peaks;

means for injecting said binary constraint at the site of each peak and for reading a resultant local state for a peak then being processed by the processor;

means for storing a conditional state as a function of the binary constraint injected and of the local state of said peak being processed;

means for producing successive iterations of the injecting of the binary constraint and the storing of the conditional state for a plurality of values of successive binary constraints corresponding to digitized data comprising bit maps;

a local data storage register for storing the local data to be processed, said register being read/write controlled from an inputs-outputs BUS link and delivering, on reading, a configuration signal of said binary resistor network;

a control register for activation-inhibition control of the injecting of a binary constraint at the site of a peak being processed, said control register being read/write controlled from said inputs-outputs BUS link and delivering, on reading, a masking signal for masking the injecting of binary constraint;

a binary constraint storage register for storing said binary constraint to be imposed on said peak being processed; and     a node-forming circuit for said binary resistor network, said node-forming circuit and a corresponding elementary processor forming said peak of said binary resistor network being processed, said node-forming circuit comprising:

four switching transistors each forming an arch transistor which has an index and provides a link, through the same index of the node being processed, with a neighboring node, each arch transistor including a control electrode for receiving said configuration signal delivered by said local data storage register,         a precharge transistor of a first conduction type connected between a supply voltage and said node-forming circuit, said precharge transistor being switch controlled by a precharge signal,     a control circuit for activation-inhibition control of the injecting of the binary constraint into the site of the peak being processed, said control circuit comprising, connected in cascade between said node-forming circuit and a reference potential, a first activation-inhibition transistor including a control electrode for receiving said masking signal which is delivered on reading by said control circuit, a second binary constraint injection transistor including a control electrode for receiving said binary constraint signal delivered by said binary constraint storage register, a third terminating transistor of a conduction type opposite to the conduction type of said precharge transistor, said control circuit further comprising a feed-back circuit comprising a feed-back transistor operating as a switch between said node-forming circuit and a common point between said second and third transistors and by a logic inverter having an input connected to said node-forming circuit and an output connected to a control electrode of said feed-back transistor and to a control input of said control register, and said binary constraint storage register, so as to deliver a signal representative of the state of said peak being processed, wherein each node-forming circuit has an associated voltage and wherein said node-forming circuits of associated voltage and wherein said node-forming circuits of said network, interconnected by said arch transistors, form said accelerated Manchester chain, each control circuit interconnected by conductive arch transistors enabling the carrying out, after a precharge step bringing the voltage of each node-forming circuit up to the supply voltage, of the following steps:

ending of said precharge step and a further step of connecting said third terminating transistor, and, as a function of said masking signal and binary constraint signal applied to said first and second transistors,     a step of discharging of parasitic capacitances of said node being processed, by means of said feed-back circuit, thereby enabling successive corresponding discharging of said parasitic capacitances of all node-forming forming circuits interconnected with said peak being processed, said interconnected node forming circuits thus forming peaks related by means of at least one arch transistor forming a binary resistor to the peak being processed at which an initial discharge occurred, thereby enabling a segmented diffusion toward the related peaks of said local binary constraint applied at the site of said peak being processed.

8. The binary resistor network of claim 7, wherein said transistors comprise CMOS transistors of an integrated circuit.

* * * * *